United States Patent
Caldwell, III et al.

(10) Patent No.: US 6,597,892 B1
(45) Date of Patent: Jul. 22, 2003

(54) AUTOMATED GROUND SYSTEM WITH TELEMETRY INITIATED COMMAND ASSISTANCE

(75) Inventors: Winfield A. Caldwell, III, Mount Airy, MD (US); Anthony W. Massaro, Erwinna, PA (US); Kevin J. Moscatiello, Port Jervis, NY (US); Thomas G. Nowak, Langhorne, PA (US); Michael E. Pritchard, Yardley, PA (US); John Philip Schramm, Doylestown, PA (US); Christopher Taylor, Neptune, NJ (US); Henry H. White, Manalapan, NJ (US)

(73) Assignee: SES Americom, Princeton, NJ (US)

( * ) Notice: Subject to any disclaimer, the term of this patent is extended or adjusted under 35 U.S.C. 154(b) by 0 days.

(21) Appl. No.: 09/551,732

(22) Filed: Apr. 18, 2000

(51) Int. Cl.[7] .............................................. H04B 7/185
(52) U.S. Cl. .................... 455/12.1; 455/11.1; 455/13.1; 455/426; 455/427; 370/241
(58) Field of Search ............................... 455/11.1, 12.1, 455/13.1, 427, 426; 370/241; 714/134; 340/870.01–870.44

(56) References Cited

U.S. PATENT DOCUMENTS

| | | | | |
|---|---|---|---|---|
| 5,721,810 A | * | 2/1998 | Hahn et al. ................... | 706/47 |
| 5,992,799 A | | 11/1999 | Gamble et al. | |
| 6,052,588 A | * | 4/2000 | Mo et al. ..................... | 455/430 |
| 6,262,659 B1 | * | 7/2001 | Korkosz et al. ............. | 340/539 |
| 6,272,341 B1 | * | 8/2001 | Threadgill et al. .......... | 455/428 |
| 6,292,659 B1 | * | 9/2001 | Olds et al. ................... | 455/427 |

OTHER PUBLICATIONS

Telesat, "Milestones", pub. date unknown, web pages from http://www.telesat.ca.

* cited by examiner

*Primary Examiner*—William Trost
*Assistant Examiner*—Marcos Torres
(74) *Attorney, Agent, or Firm*—Whitham, Curtis & Christofferson, P.C.

(57) ABSTRACT

A ground-control system for a fleet of satellites provides a highly reliable means that automatically recognizes undesirable telemetry state changes and automatically transmits the required commands to the proper satellite to place the satellite operational parameters into the desired state. The ground-control system utilizes hardware, software and two redundant ground-control sites: a Control site and a Monitor site. There may also be a number of disabled sites to replace one of the redundant ground-control sites, at a moment's notice, if necessary. Both redundant sites constantly and independently monitor and verify validity of satellite telemetry. Upon occurrence of an undesired state change (event) upon a particular satellite, ground-control computers at both sites independently recognize the event and automatically begin a response. The control site computer verifies no critical satellite on-board commanding is scheduled to take place, discontinues interruptible activities, directs the monitor site computer to stop any transmission to the event satellite, switches the RF hardware to access the proper satellite and transmits the required commands. If the control site computer cannot interrupt its own activities, it directs the monitor site computer to verify no critical satellite on-board commanding is scheduled to take place and then discontinues interruptible activities to transmit the required commands. If the monitor site computer cannot interrupt activities, it passes the response back to the control site where the control site computer stores the required commands in the queue until activities can be interrupted for the transmission of the required commands.

14 Claims, 4 Drawing Sheets

AUTOMATED GROUND SYSTEM WITH TELEMETRY INITIATED COMMAND ASSISTANCE

FIELD OF THE INVENTION

The present invention relates to ground based satellite control and, more particularly, to a system which utilizes multiple ground stations to sense an undesirable state change on a satellite and automatically transmit the command sequence required to place the satellite into a desired state.

BACKGROUND OF THE INVENTION

Operational satellites require two-way communications in order to function. Satellite telemetry data is transmitted from in-orbit satellites to a ground station in order to indicate the state of specific satellite operational parameters. Satellite command data is transmitted to in-orbit satellites in order to deliberately execute a change in specific satellite operational parameters. The ground-control system consists of a coordinated network of multiple ground-control sites, each site containing the necessary personnel, computers, baseband and radio frequency (RF) equipment to receive/process satellite telemetry, and generate/transmit commands to multiple satellites.

Often, a change in telemetry indicates a change in the state of specific satellite parameter(s). This occurs constantly in the normal course of satellite operations. Occasionally, a state change occurs that is considered undesired because it will cause a customer service outage and/or potential damage to the satellite. Undesired state changes usually require responses from the ground-control system. A ground station to satellite response consists of recognition by the ground-control system of a true undesired state change, and then transmitting the required commands to the satellite to place the parameter into a desired state. An expedient response minimizes the effects of an undesired state change.

Traditionally, responses have involved human interaction which has limited the speed of the response. Ground-loop control techniques have been documented solely for the attitude controlling aspects of autonomous satellite ground-control; this requires an extensive implementation and dedicated ground-control equipment (see Ground Loop Attitude Control System (GLACS) by Telesat Canada and U.S. Pat. No. 5,992,799 to Gamble et al.).

Other efforts to address these issues included the deployment of redundant ground commanding, monitoring, and control sites in geographically separated locations and the use of customized software to synchronize commanding activities between these sites. Activities at the redundant backup site can compromise an automated response without customized software designed to handle very specific undesired state-change events for very specific satellite architectures. Such software requires specialized testing and extensive empirical validation. System maintenance becomes prohibitively labor intensive requiring extensive software modifications as the legacy software system evolves to handle an ever-expanding ground system requirement set as a satellite fleet expands with time.

In addition, the customized solution described above assumes that a current primary/backup relationship between two sites will remain unchanged indefinitely. This puts unreasonable constraints on the allocation and availability of ground system resources. Customized software solutions solve undesirable telemetry state change issues in a very specialized fashion. A customized approach proves to be inappropriate and ineffective as the number and types of telemetry states that can benefit from a n automated command response system grows appreciably as a satellite fleet expands and diversifies.

This type of operational environment makes it imperative to deploy a more flexible and generic solution that would serve to resolve such problems for any set of telemetry states that needed to be automatically monitored for an entire fleet of satellites operating concurrently.

Finally, customized software solutions in the past have failed to account for automatic commanding events scheduled and stored on-board a satellite. For those satellites currently in orbit that have scheduled automatic commands stored in onboard command registers, uncontrolled automatic commanding from a ground station would conflict with those on the affected satellite and could prove deleterious to the health and/or performance of the satellite.

SUMMARY OF THE INVENTION

In an exemplary embodiment of the invention, a ground-control system provides a highly reliable means that automatically recognizes undesirable telemetry state changes and automatically transmits the required commands to the proper satellite to place the satellite operational parameters into the desired state.

According to the invention, there is provided a ground-control system that utilizes inter-site communications links, hardware, software and two redundant ground-control sites with any of the other available ground-control sites in the system acting as hot stand-by sites. The invention comprises a primary (control) site and a back-up (monitor) site, both of which constantly and independently monitor and verify validity of satellite telemetry. Upon occurrence of an undesired state change (event) upon a particular satellite, ground-control computers at both sites independently recognize the event and automatically begin a response. The control site computer verifies no critical satellite on-board commanding is scheduled to take place, discontinues interruptible activities, the monitor site computer stops any transmission to the event satellite, the control site switches the RF hardware to access the proper satellite and transmits the required commands.

If the control site computer cannot interrupt activities, it directs the monitor site computer to verify no critical satellite on-board commanding is scheduled to take place and then discontinues interruptible activities to transmit the required commands. If the monitor site computer cannot interrupt activities, it passes the response back to the control site where the control site stores the required commands in the queue until activities can be interrupted for their transmission.

The sharing of commanding computer equipment between multiple satellites at a given ground-control site minimizes the efforts and resources associated with purchasing, updating and maintaining the equipment and associated hardware.

The preferred embodiment uses dual ground-control sites which utilize the redundancies associated with this dual path arrangement and maximizes the likelihood of a successful response. Using two independent and geographically diverse sites has the benefit of minimizing the possibility of ground command transmission problems that are associated with weather and natural disasters; there is a low likelihood that both sites will be affected simultaneously.

In accordance with the invention, the preferred embodiment provides a ground system software/hardware architecture which is robust enough to provide the following features:

geographically distributed multiple site spacecraft fleet command system architecture;

multiple site dynamically configurable control/monitor redundant ground site configuration setup via database specifications and/or real-time graphics user interface (GUI) supported system software directives;

compatibility with any commercially available geosynchronous spacecraft;

hierarchical rules-based design to accommodate sequential back- to-back event handling;

flexible database driven design that supports/anticipates a wide range of dynamically configurable operational requirements and contingencies without modifications to the ground-control system software;

system support for both saved and default ground-control system application server initialization/reconfiguration;

graceful accommodation and synchronization of dynamically changing database system parameters in a distributed environment (i.e., a controlled-distribution approach to update and maintain system's main database files); and distributed tracking mechanism to aid in the arbitration between ground-system commanding events and on-board spacecraft automatic commanding events.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Figure 1A:
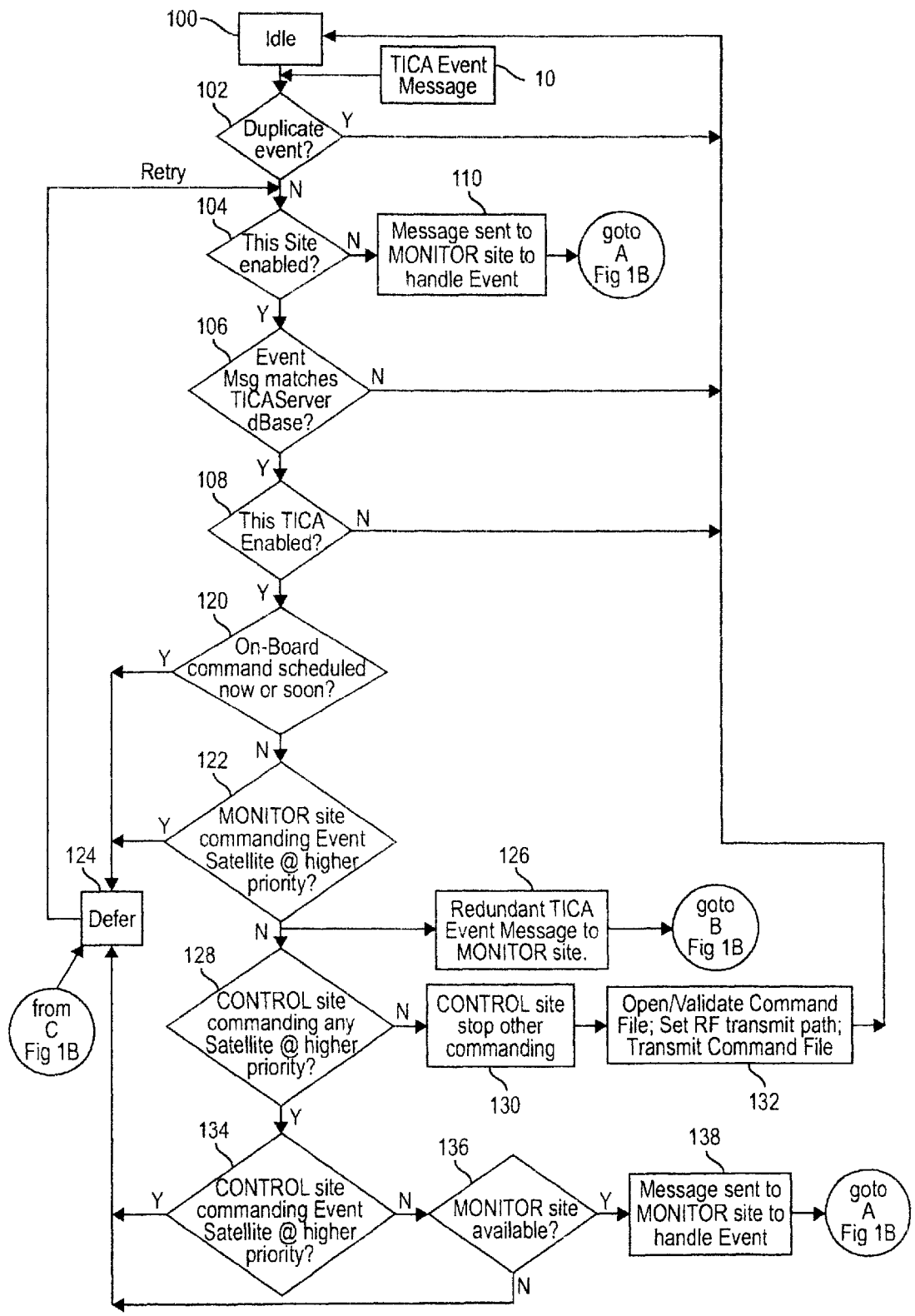
FIGS. 1A and 1B are a functional flow diagram of Telemetry Initiated Command Assistance (TICA) Server arbitration.

The preferred embodiment of the present invention is a database-driven distributed software system comprising at least one primary (control) and one redundant (monitor) Telemetry-Initiated Command Assistant Server (TICA Server). A TICA Server resides on the ground-control computer at each ground-control site, referred to as "sites". The TICA Server at each site is capable of operating independently, depending on the TICA database parameters, Golden TICA tables and TICA graphics user interface (GUI) settings.

The TICA database is a user-created system configuration file containing the information that defines the default operational parameters for a TICA response. Each required response to a particular undesired state change, referred to as an "event", is assembled as an individual TICA Event Parameter Set, referred to as a "TICA record", containing the TICA parameter values. These operational parameter are listed in Table 1. The TICA Server uses these default values in the ground-control system at a particular site when a new TICA record is introduced. An operator can use the TICA GUI to temporarily modify the default values of these parameters to accommodate ground-control system maintenance, etc. An example of this would be the transfer of TICA response functions to other available sites.

A temporary change instituted through the TICA GUI is also recorded in the Golden TICA Table at each site. The function of the Golden TICA Table is to record the operational TICA parameter values; these consist of mostly default, but also some non-default parameter values, those of which would have been set via the TICA GUI.

The use of this "Golden TICA Table" concept enables all TICA Servers at all sites to operate independently (i.e., no reliance on other sites during an event), yet uniformity using an identical TICA Database. This is of particular use when any one of the sites becomes deactivated, and is subsequently reactivated. It ensures the identical and current operational TICA parameter values are installed at all the available sites.

The TICA parameter number is indicated in the first column of Table 1. TICA parameters 2, 3 and 4 define the operational status and responsible site for the primary and backup operation of a specific TICA record for the TICA Servers at all available sites. The primary site for a TICA response is referred to as the "Control" site, and the backup site for a TICA is referred to as the "Monitor" site.

TABLE 1

TICA Server Database.

| TICA Record No. | TICA Parameter | Definition (& Valid Entries) |
|---|---|---|
| 1 | ID | Identifier for this individual TICA record |
| 2 | Status | (Enabled/Disabled) the default operational status for this individual TICA record; ENABLED allows a TICA response if the Trigger criteria is met |
| 3 | Control Site | (One of the ground-control sites) the default site for control mode for this individual TICA record |
| 4 | Monitor Site | (One of the ground-control sites) the default site for monitor mode for this individual TICA record |
| 5 | Telemetry Parameter | the telemetry parameter to observe that will indicate an undesired state change |
| 6 | Satellite Telemetry Stream | the satellite telemetry stream where telemetry parameter resides |
| 7 | Qualifier | to compare telemetry parameter to the undesired state (=, <, >, etc.) |
| 8 | Trigger Value | the value defining the undesired state for the telemetry parameter; this combined with the qualifier defines the trigger criteria |
| 9 | Event Validation Algorithm | an optional feature to allow complex validation schemes for events |
| 10 | Consecutive Telemetry Frame Sample Quantity | a feature to verify a real event vs. an unrelated telemetry noise |
| 11 | Command Sequence Name | the set of commands that are sent to place a satellite into a desired state, as indicated by the telemetry parameter |
| 12 | Priority Level | a priority setting for the TICA record; to allow arbitration and prioritization during multiple activities (TICA's and others) as the ground-control system will execute activities of higher priority |
| 13 | Autosend Enable | (Y/N) a selectable feature; upon Trigger: YES: allows a fully automatic command sequence transmission; NO: executes only an automatic setup of ground-control system for manual command sequence transmission |
| 14 | Autosend Delay | (seconds) if Autosend feature is disabled, the duration of time to wait and then perform an Autosend function |
| 15 | On-Board Command | (seconds) a safety feature to prevent a TICA response during a scheduled stored |

TABLE 1-continued

TICA Server Database.

| TICA Record No. | TICA Parameter | Definition (& Valid Entries) |
|---|---|---|
| | Execution Uncertainty | (on-board) command sequence: the uncertainty involved with knowing when a stored command sequence will occur on the affected satellite |
| 16 | TICA Command Sequence Execution Duration | (seconds) a safety feature to prevent a TICA response too soon before a scheduled stored (on-board) command sequence: the duration of the individual TICA command sequence transmission |
| 17 | Re-transit Delay | (seconds) a feature that defines the duration the TICA software will wait until it will execute another Autosend function |
| 18 | Maximum Transmit Quantity | a feature that defines the maximum number of times the TICA software will execute Autosend functions |
| 19 | Message Alert | an identifier for a text message to be displayed to the human operator upon Trigger of this TICA record |
| 20 | Time Enable Function | (Y/N/DAILY) a feature that will allow the following for the respective entries: NO: Enables this TICA record at all times YES: Enables this TICA record only during the window defined by the start time and end time DAILY: Enables this TICA record every day only during the window defined by the start time and end time YES and the proper Trigger: will initiate the TICA record at the Start Time |
| 21 | Time Enable Start Time | (hh:mm:ss mm/dd/yyyy) |
| 22 | Time Enable End Time | (hh:mm:ss mm/dd/yyyy) |
| 23 | Comment | a text entry for general reference |

The TICA Database and/or Golden TICA Table does not only direct the TICA Server, it also defines parameters that direct another process in the ground-control system: the Telemetry Processing Unit Ground Station Processor Server (TPU GSPServer). At each site, the TPU GSPServer processes the raw telemetry stream from the satellite and will determine if an undesired telemetry state-change has occurred, based on TICA parameters 5 to 10 in the TICA Database (Table 1).

Also, at each site, the TICA Server processes the command sequences to be transmitted to the satellite and will determine if commanding can be performed on the satellite on which the TICA is attempting to execute, based on TICA parameter 12 in the TICA Database. The TICA Server will preempt existing command sequences to the satellite experiencing the event or any other satellites if the priority of those commands is below that of the TICA. In response to an event, the preferred embodiment of this invention entails the TICA Server at a control site to direct the monitor site to respond if the control site is busy with higher priority activities. Another fail-safe aspect of the preferred embodiment allows the monitor site to respond to events directly if the control site has been disabled.

Certain parameters within the TICA database can be updated online using the GUI interface mechanism described above. More extensive changes to the TICA database would be performed using the ground station's database maintenance and update utilities. This software suite of tools has its own GUI and is used to validate and distribute copies of the updated database to all of the various network platforms. Regardless of which ground site operator has updated a local TICA database, the database must be distributed throughout the system so that all sites contain the same "golden" tables.

Other ground-system processes that interface with the TICA Server are the Video NodeServer and the Control Work Station (CWS) Switchserver. The Video NodeServer stores and makes available to the TICA Server the knowledge of periods of time when stored commands sequences will operate on-board a satellite. In the preferred embodiment, the Video NodeServer provides periodic updates to the TICA Server of the stored commands. A CommonServer shares the data used by the TICA server and receives instantaneous updates from the Video NodeServer in order to maintain the shared data including the stored on-board commands. The CWS Switchserver controls the path of the command sequences as transmitted by the Command and Ranging Generator (CRG) NodeServer so that the correct command sequences are transmitted to the proper satellite. The CRG sends both corrective and routine commands sequences to the satellite.

The deployment of this invention involves no additional hardware or customized sequence files. Conventional command sequence files that are traditionally generated for transmission via human operator are employed in the preferred embodiment.

Figure 1B:
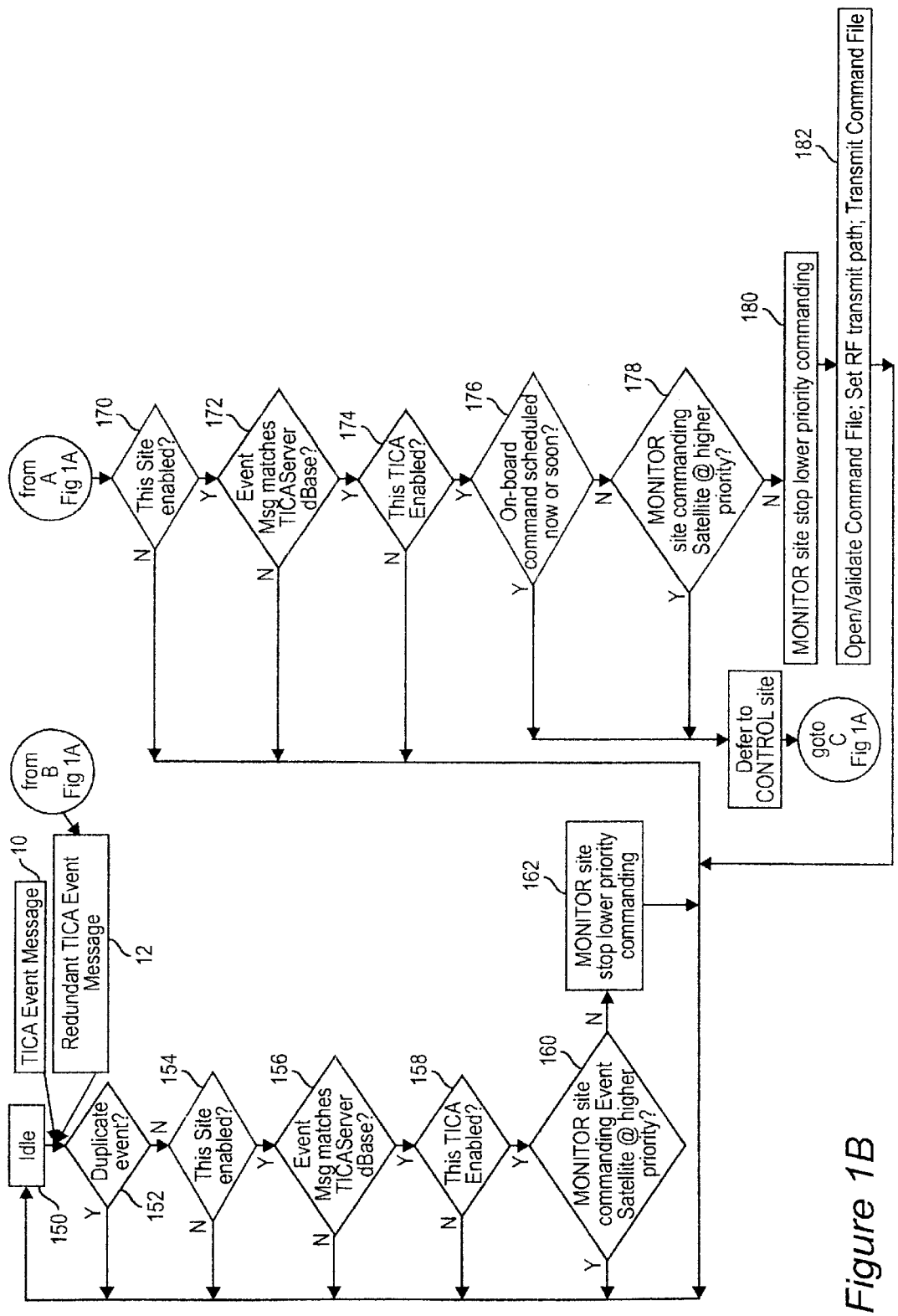

Referring to the drawings, and more particularly to FIGS. 1A and 1B, there is shown a flow diagram of Telemetry Initiated Command Assistance (TICA) Server arbitration. The diagram shows the flow of data and control for both the Control and Monitor TICA servers, and the communications between the two. FIG. 1A generally shows the flow for the Control TICA and FIG. 1B generally shows the flow for the Monitor TICA.

Referring first to FIG. 1A, the TICA server stays in an idle state 100 until an undesired state change event message 10 is received. A determination is made in decision block 102 as to whether this is a duplicate event, i.e., that the message has come from more than one source. If not, a determination is made in decision block 104 as to whether the site is enabled, i.e., whether the TICA is designated as the Control. If so, a determination is made in decision block 106 as to whether the telemetry mnemonics match the proper identification and parameters in the TICA Server database, as described in Table 1. If so, it is determined whether the TICA process is enabled in function block 108. If not, control passes back to function block 100 and the Control system remains idle, awaiting another event message 10. Similarly, if the event message 10 did not match the database, as determined in decision block 106, control passes back to function block 100 and the Control system remains idle, awaiting another event message 10. If the Site is not enabled, as determined in decision block 104, then a message is sent to the Monitor site in block 110 to handle the event 10. The process of the Monitor site is described later.

If the TICA process is enabled, as determined in function block 108, then a determination is made as to whether any on-board commands are scheduled at the current time or near in the future, in decision block 120. If not, a determination of whether the Monitor site is currently commanding an event for the satellite at a higher priority in decision block 122. If either of these conditions are true, then the TICA response is deferred in function block 124 and control is passed back to decision block 104. If not, a redundant TICA event message is sent to the Monitor site in block 126 and the Control site determines whether it is already commanding the satellite at a higher priority in decision block 128.

If the Control site is not already commanding the satellite at a higher priority, then the Control site suspends other commanding of the satellite in block 130, and then opens/validates the command file, sets the RF transmit path and then transmits the command file to the satellite in block 132. Otherwise, another determination is made as to whether the Control site is commanding the satellite at a higher priority in decision block 134. If so, then the TICA response is deferred in function block 124 and control is passed back to decision block 104.

If the Control site is not commanding the satellite at a higher priority then another determination is made as to whether the Monitor site is commanding a satellite at a higher priority in decision block 136. If so, once again TICA response is deferred. If not, a message is sent to the Monitor site to handle the event in block 138.

Referring now to FIG. 1B, the process flow of the Monitor site is described. The Monitor site sits in an idle state in function block 150 until a TICA event message 10 or redundant TICA event 12 (as sent in block 126 of FIG. 1A) is received. A determination is made as to whether the event received is a duplicate event in decision block 152. If not, a determination is made as to whether this Monitor site is enabled in decision block 154. If so, then a determination is made as to whether the event matches the parameters in the TICA Server database, as described above, in decision block 156. If the TICA is enabled, as determined in decision block 158, then a determination is made as to whether the Monitor site is commanding an event on the satellite at a higher priority, in decision block 160. If not, the Monitor site stops the lower priority commanding in block 162. The Monitor site then returns to the idle state in block 150.

If a message was sent to the Monitor site for handling (block 138, FIG. 1A) then a determination is made as to whether the Monitor site is enabled, in decision block 170. If so, a determination is made as to whether the message matches the criteria in the TICA Server Database in decision block 172. A determination is made as to whether the TICA is enabled in decision block 174. If none of these conditions are met, the process continues in the idle state in block 150. Otherwise, a determination is made as to whether any on-board commands are scheduled at the current time or near in the future, in decision block 176. If not, then a determination is made as to whether the Monitor site is commanding an event on any satellite at a higher priority in decision block 178. If not, the Monitor site stops any lower priority commanding in block 180 and then opens/validates the command file, sets the RF transmit path and then transmits the command file to the satellite in block 182. If on-board commands conflict, or if higher priority commands are scheduled as determined in decision blocks 176 and 178, then control of the satellite is deferred and processing continues with block 124 of FIG. 1A.

Figure 2:
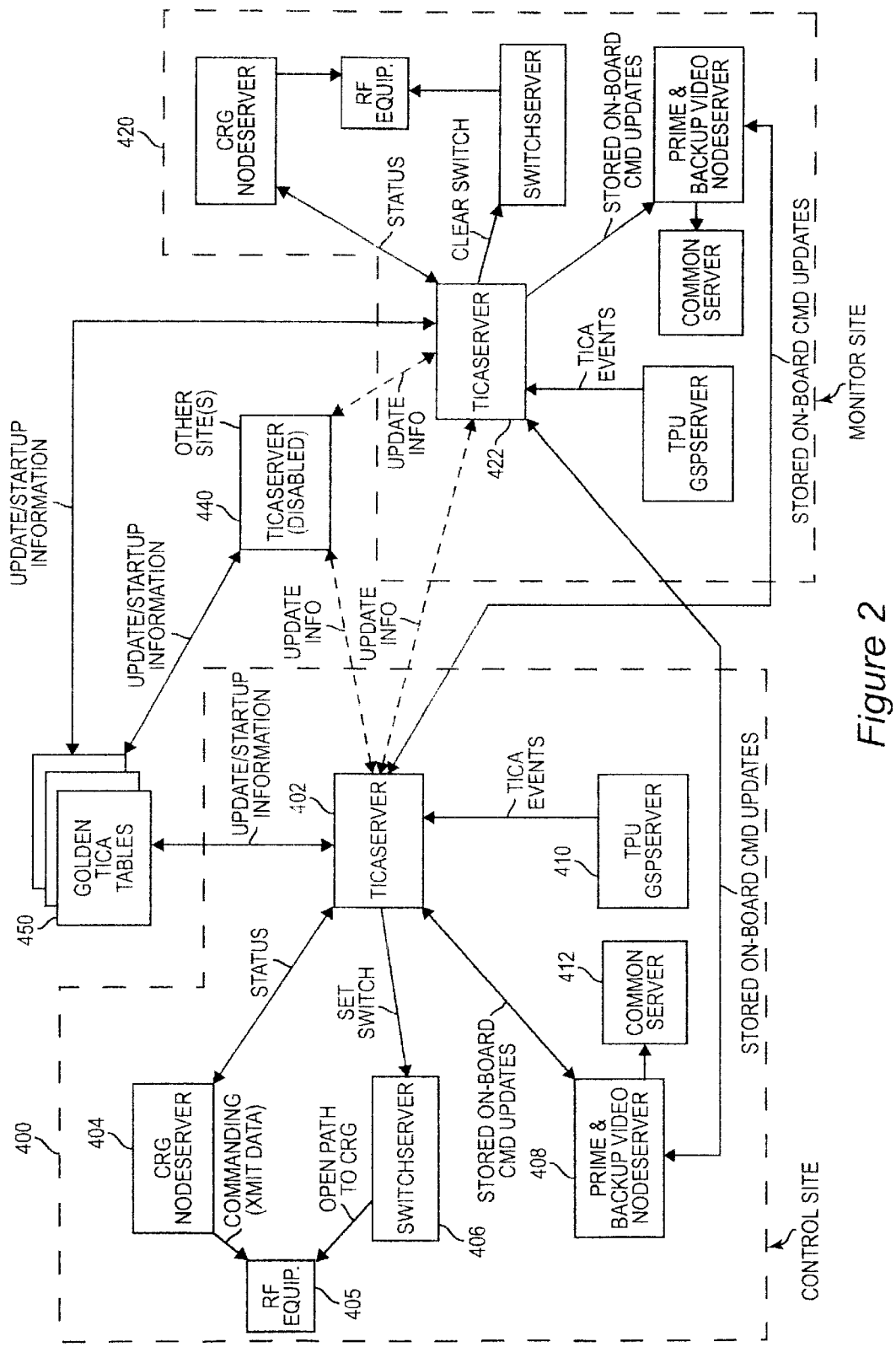
FIG. 2 shows a high level data flow diagram of the network of TICA Server ground stations and servers.

Now referring to FIG. 2, there is shown a high level diagram of data flow through the network of ground stations controlling the satellites of the system. A Control site 400, a Monitor site 420, and a representation of other (disabled) sites 440 are shown along with their lines of communication. The Control site comprises a TICA Server 402, a Command and Ranging Generator (CRG) NodeServer 404, a control workstation (CWS) SwitchServer 406, a prime and backup Vide NodeServer 408, a Telemetry Processing Unit (TPU) GSPServer 410, and a CommonServer 412. The Monitor and other sites will typically comprise the same configuration of hardware. In alternative embodiments, the sites will perform the same functions, but they will be allocated to varying hardware suites.

The TICA Server receives its startup information from the Golden TICA tables in the TICA database 450. Each site has its own local corresponding database so that it may operate independently. However, each corresponding database maintains identical data. As parameters are changed in the system, for either satellite control or ground station monitoring and control, the corresponding TICA databases, as described above, are updated by any one of the TICA Servers 402, 422, 440 via a network. A TICA Server can also send update information directly to another TICA Server at a different control site. The TICA Server is responsible for:
  interpreting a new TICA database file;
  maintaining TICA record enable/disable updates;
  maintaining control/monitor site updates;
  receiving scheduled on-board command window updates from the Video NodeServer;
  receiving TICA triggers from TPUs;
  arbitrating based on CRG status;
  alert generation; and
  scheduling TICA command process:
    set UPLINK switch points;
    perform equivalent of manual commanding.

Figure 3:
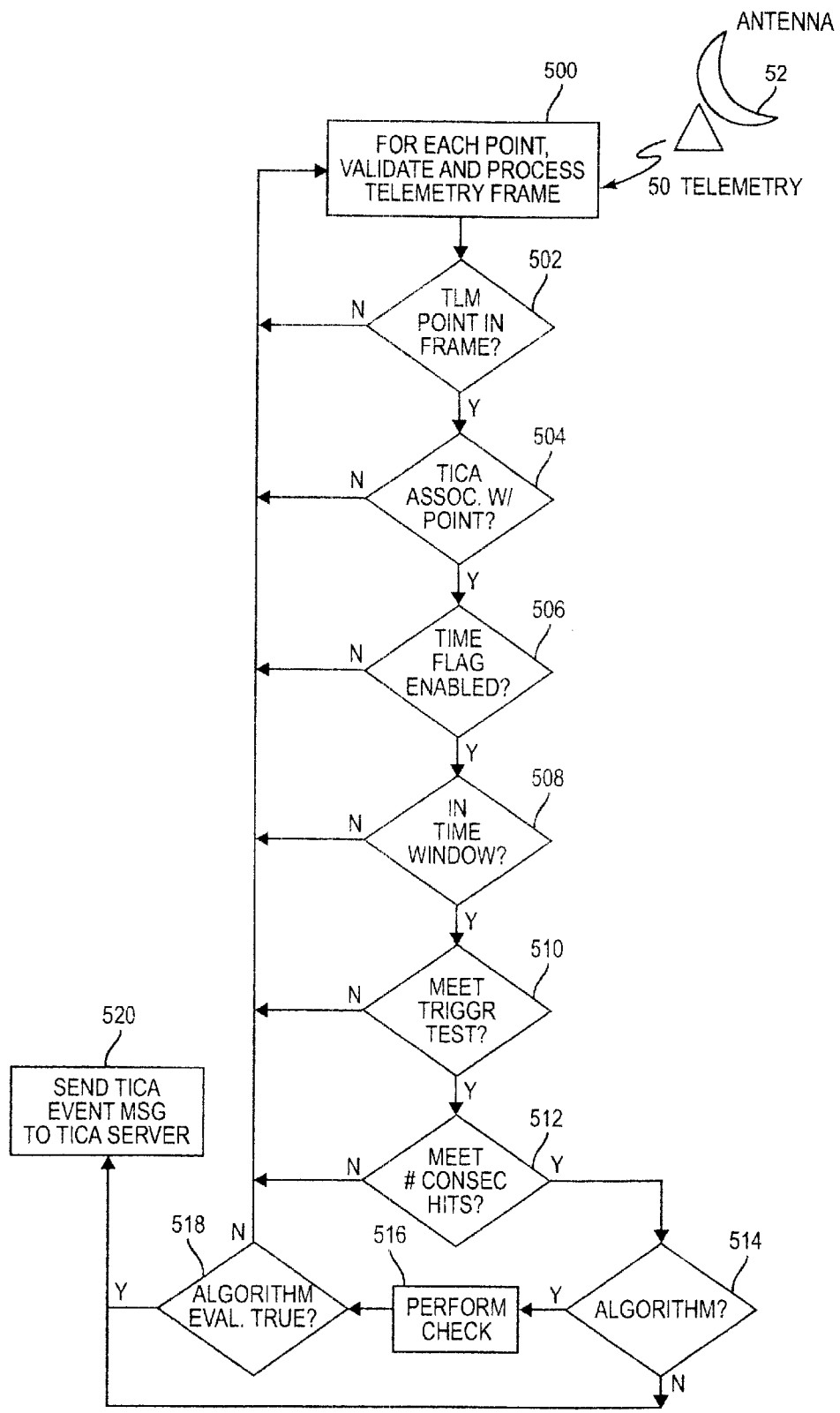
FIG. 3 shows a flow diagram for the processing of telemetry information by the Telemetry Processing Unit Ground Station Processor Server (TPU GSPServer).

FIG. 3 illustrates the telemetry processing that occurs in the TPU GSPServer to determine whether there exists an event to forward to the TICA Server. A telemetry frame 50 is received from the satellite via an antenna 52 and processed by the TPU GSPServer 410. For each point, or datum within a telemetry frame, the frame is validated and processed in block 500. The frame is verified as valid as coming from the satellite and as uncorrupted data. In the preferred embodiment of the present invention, various formats of telemetry frams are supported; these telemetry frames range in length from 128 to 256 words with each word consisting of 8 bits of data, and the telemetry frame rate ranging from 512 to 4096 bits per second. It would be apparent to one skilled in the art that any format of telemetry frame could be supported by this invention.

The point is determined to be in the frame in decision block 502. If so, the TICA database is checked in to determine whether there is a database entry that corresponds to this particular point data in decision block 504. All points are not considered to be TICA points that must be checked in real time. If this is a TICA point, then a determination is made as to whether the time flag (see TICA database item 20) is enabled in decision block 506. There may be times when review of a particular point of telemetry is not necessary, for instance it is a solar array datum and the satellite is on the dark side of the earth, etc. Therefore a TICA datum has a flag set or not to indicate whether to always review the data or only at certain times. If the TICA is enabled for the current time (see start and end times in TICA database items 21 and 22), as determined in decision block 508, then a determination is made as to whether the trigger criteria is met (see TICA database item 8), in decision block 510. Because corrupted data or spurious information can be received, the trigger is not typically met until the same data has been received in a desired number of frames, i.e., consecutive hits (see TICA database item 10). A determination is made as to whether the trigger criteria is met in the desired consecutive number of hits in decision block 512.

If there is an event validation algorithm (as defined in the TICA database item 9) for this TICA event as determined in decision block 514, then an algorithm is processed in block 516. The event algorithm is used to add specialized functions that allow further validation of a TICA event when the trigger alone is not sufficient. The algorithm may look at other data in the same frame or may just look at an individual datum for a double check to see if a valid problem exists. If the event is a real event, as determined in decision block 518, then it is sent to the TICA Server 402 for processing as an event message in block 520. If the desired number of consecutive hits are not met, or any other of these conditions fail, the processing continues with each point in the frame and then for each consecutive telemetry frame received.

Referring again to FIG. 2, the Control site requests status of the current commanding state of the CRG. The CRG NodeServer controls messages sent to the RF equipment 405 to be sent to a satellite through an antenna. The Control site communicates with the CRG NodeServer 404 to determine status of the CRG. The CRG NodeServer 404 is the process responsible for receiving/sending messages to other computers. One of these messages is to provide its current commanding state to the TICA server.

The CommonServer 412 is located on the ground-control site computer and is used to access information required to be stored in and retrieved from the computer's shared memory segment. This information needs to be updated in real-time and readily available for any of the ground-control site servers that require access to mission critical information (e.g., TICA Server). The CommonServer receives instantaneous updates from the Video NodeServer regarding on-board commands and stores these updates in shared memory, thereby making them immediately accessible to the TICA Server between its periodic updates.

The Video NodeServer 408 obtains telemetry information from the TPU GSPServer. It processes, tracks and disseminates information related to the status of the uninterruptible stored on-board automatic commands for any given spacecraft. This Video NodeServer sends the information to the following two (2) different servers located on the ground-control workstation: the CommonServer and the TICA Server. The CommonServer is notified immediately of updates, but the TICA Server receives periodic full sets of information. When ground control personnel adjust the stored on-board command parameters via traditional commanding, the CommonServer is notified of the instantaneous commanded state change as it occurs on any of the on-board command registers. On the other hand, the TICA Server polls the Video NodeServer every 15 minutes for the status of the entire set of on-board command registers. In addition, a distributed network mechanism is employed to allow the Video NodeServer to poll on-board command register information from other local or remote Video NodeServers. This feature is crucial during system restarts and database updates to maintain a current set of data for a site.

The Video NodeServer may also be initialized with all of the on-board command register state information stored from the previous application session. This allows for the greatest flexibility during application initialization and restart events. Thus, if the Video NodeServer at a control site is restarted and cannot be updated with data from another Video NodeServer, for instance due to networking problems, it can be restored with recent data.

If the Control site is able to command the satellite, based on the process as described in FIGS. 1A and 1B, then the switches are set by the Switchserver 406 and the command sequence is uplinked to the satellite.

The key features of the handshake communication between and among the various TICA servers of the preferred embodiment of the present invention are summarized below:

If the commanding system at the Control site is in use (maneuver, etc.) the commanding system at the Monitor site will automatically be used.

Additional automatic satellite commanding and ground station actions (pop ups, delays, etc.) can be added via the Telemetry Initiated Command Assistant (TICA) table.

Developed software architecture is easier to implement, maintain, and test than existing systems.

It would be apparent to one skilled in the art that the various servers communicating at a specific site perform a set of functions which may be reallocated or combined to an alternative suite of hardware as an alternative embodiment. It would also be apparent to one skilled in the art that the TICA server and associated servers at a control site interact with redundant systems at monitor and disabled sites, but that the hardware configuration of the systems at the redundant sites may also vary.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A satellite ground-control system for a fleet of at least one satellite that automatically detects database-specified telemetry state changes on monitored satellites in the fleet and transmits required commands to an appropriate satellite in the fleet in order to configure the appropriate satellite's operational parameters into a desired state, wherein the system utilizes redundant, geographically-distributed ground-control sites in a network architecture and associated ground-control system software, comprising:

means for maintaining a plurality of Telemetry Initiated Command Assistance (TICA) table databases, each of the TICA table databases corresponding to a ground control site, the TICA table databases containing information related to satellite telemetry, ground station control, values to trigger a command response to the undesirable telemetry state changes referred to as events, said TICA table databases being updateable by an authorized ground-control site;

a first ground-control site independently monitoring satellite telemetry from the fleet of at least one satellite, comprising:

a first TICA Server for responding to undesirable telemetry state changes by selecting pre-defined command sequences to be sent to a satellite in the fleet of at least one satellite;

a first telemetry processing unit ground system process server (TPU GSPServer) for pre-processing telemetry frames comprising points of datum received from the fleet of at least one satellite, the pre-processing of the telemetry frames determining: satellite identification information, whether datum points are received in an uncorrupted state, whether a datum point is referenced in the corresponding TICA table database, and if so, determining whether an undesirable event has occurred and if so, then sending a TICA event message to the first TICA server;

a first command and ranging generator (CRG) NodeServer providing command priority messages to the first TICA server;

a first primary Video NodeServer, and a first backup Video NodeServer communicating stored on-board commands updates with at least one TICA Server in the ground system;

a second ground-control site independently monitoring satellite telemetry from the fleet of at least one satellite, comprising:

a second TICA Server for responding to undesirable telemetry state changes by generating command messages to be sent to a satellite in the fleet of at least one satellite;

a second telemetry processing unit ground system process server (TPU GSPServer) for pre-processing telemetry frames comprising points of datum received from the fleet of at least one satellite, the pre-processing of the telemetry frames determining: satellite identification information, whether datum points are received in an uncorrupted state, whether a datum point is referenced in the corresponding TICA table database, and if so, determining whether an undesirable event has occurred and if so, then sending a TICA event message to the second TICA server;

a second command and ranging generator (CRG) NodeServer providing command priority messages to the first and second TICA server;

a second primary Video NodeServer, and a second backup Video NodeServer communicating stored on-board commands updates with at least one TICA Server in the ground system, wherein one of the TICA Servers of the first and second TICA Servers is designated a Control TICA Server and the other TICA server is designated as a Monitor TICA server, the Control and Monitor TICA servers communicating update information between them, and the Control TICA server responding to TICA events, as necessary, but when the Control TICA server is busy, directing the Monitor TICA server to respond to selected TICA event messages.

2. A system as recited in claim 1, further comprising a CommonServer for maintaining shared data including stored on-board commands, the shared data being accessible by the TICA Server, the CommonServer receiving instantaneous stored on-board commands updates, wherein the TICA Servers receive periodic stored on-board commands updates from a Video NodeServer.

3. A system as recited in claim 1, wherein each Video NodeServer is capable of polling other Video NodeServers in real-time to obtain updated information corresponding to on-board commands, thereby mitigating lost data due to downtime, restarts or database updates and initialization.

4. A system as recited in claim 1, wherein the first ground-control site further comprises a first SwitchServer for receiving messages from the first TICA Server to control signal transmission equipment, the first SwitchServer establishing a signal path to enable sending command sequences to the proper satellite in the fleet of at least one satellite, and wherein the second ground-control site further comprises a second SwitchServer for receiving messages from the second TICA Server to control signal transmission equipment, the second SwitchServer establishing a signal path to enable sending command sequences to the proper satellite in the fleet of at least one satellite, and wherein the fleet comprises more than one satellite.

5. A ground system as recited in claim 1, further comprising at least one additional ground-control site independently monitoring satellite telemetry from the fleet of at least one satellite, wherein the at least one additional ground-control site is designated as disabled in the corresponding TICA table database and does not process TICA events until the corresponding TICA table database is modified to identify the at least one additional ground-control site as either Control or Monitor site for a satellite in the fleet of at least one satellite.

6. A system as recited in claim 5, wherein the first ground-control site further comprises a first SwitchServer for receiving messages from the first TICA Server to control signal transmission equipment, the first SwitchServer establishing a signal path to enable sending command sequences to the proper satellite in the fleet of at least one satellite, and wherein the second ground-control site further comprises a second SwitchServer for receiving messages from the second TICA Server to control signal transmission equipment, the second SwitchServer establishing a signal path to enable sending command sequences to the proper satellite in the fleet of at least one satellite, and wherein the at least one additional ground-control site further comprises a further SwitchServer for receiving messages from a corresponding TICA Server to control signal transmission equipment, the further SwitchServer establishing a signal path to enable sending command sequences to the proper satellite in the fleet of at least one satellite, wherein the fleet comprises more than one satellite.

7. A satellite ground-control system for a fleet of at least one satellite that automatically detects database-specified telemetry state changes on monitored satellites in the fleet and transmits required commands to an appropriate satellite in the fleet in order to configure the appropriate satellite's operational parameters into a desired state, wherein the system utilizes redundant, geographically-distributed ground-control sites in a network architecture and associated ground-control system software, comprising:

means for maintaining a plurality of Table databases, each of the Table databases corresponding to a ground control site, the plurality of Table databases containing information related to satellite telemetry, ground station control, values to trigger a command response to undesirable telemetry state changes referred to as events, said plurality of Table databases being updateable by an authorized ground-control site;

a first ground-control site independently monitoring satellite telemetry from the fleet of at least one satellite, comprising:

a first responding means for responding to undesirable telemetry state changes by selecting pre-defined command sequences to be sent to a satellite in the fleet of at least one satellite;

a first telemetry processing means for pre-processing telemetry frames comprising points of datum received from the fleet of at least one satellite, the pre-processing of the telemetry frames determining: satellite identification information, whether datum points are received in an uncorrupted state, whether a datum point is referenced in the corresponding Table database, and if so, determining whether an undesirable event has occurred and if so, then sending an event message to the first responding means;

a first command priority message providing means for providing command priority messages to the first responding means;

a first updating means for communicating stored on-board command updates with at least one responding means in the ground system; and a second ground-control site independently monitoring satellite telemetry from the fleet of at least one satellite, comprising:
  a second responding means for responding to undesirable telemetry by generating command messages to be sent to a satellite in the fleet of at least one satellite;
  a second telemetry processing means for pre-processing telemetry frames comprising points of datum received from the fleet of at least one satellite, the pre-processing of the telemetry flames determining: satellite identification information, whether datum points are received in an uncorrupted state, whether a datum point is referenced in the corresponding Table database, and if so, determining whether an undesirable event has occurred and if so, then sending an event message to the second responding means;
  a second command priority message providing means for providing command priority messages to the second responding means;
  a second updating means for communicating stored on-board command updates with at least one responding means in the ground system, wherein one of the ground-control sites of the first and second ground-control sites is designated a Control site and the other ground-control site is designated as a Monitor site, the Control and Monitor sites communicating update information between them, and the Control site responding to events via the corresponding responding means, as necessary, but when the Control site responding means is busy, directing the Monitor site responding means to respond to selected event messages.

8. A system as recited in claim 7, wherein said means for maintaining a plurality of Table database further comprises:
  at least one graphic user interface (GUI) enabling an operator at the authorized ground-control site to enter new values for Table parameters, add records, delete records and modify records to the corresponding Table database; and
  means for distributing changes made to the corresponding Table database to all Table databases in the satellite ground-control system, thereby ensuring that all Table databases comprise identical data.

9. A method for satellite ground-control of a fleet of at least one satellite that automatically detects database-specified telemetry state changes on monitored satellites in the fleet and transmits required commands to an appropriate satellite in the fleet in order to configure the appropriate satellite's operational parameters into a desired state, wherein the system utilizes redundant, geographically-distributed ground-control sites in a network architecture and associated ground-control system software, said method comprising the steps of:
  monitoring selected telemetry points from the selected satellites by both a control site and a monitor site of the geographically-distributed ground-control sites;
  determining by both the control site and the monitor site whether an undesirable telemetry state change referred to as an event has been received in the monitoring step from a satellite in the fleet of at least one satellite by comparing the received telemetry with parameters stored in a corresponding database, the corresponding database for each ground site comprising identical data and being accessible by the other ground sites via an updating means, and if an event has been received, then automatically:
    (a) verifying by the control site that no critical satellite on-board commanding of the satellite from which the event was received is scheduled to interfere with a predefined corrective sequence of commands;
    (b) discontinuing interruptible activities of the satellite from which the event was received;
    (c) stopping any transmissions from the monitor site to the satellite from which the event was received;
    (d) switching an uplink means to transmit to the satellite from which the event was received, if the fleet of satellites comprises more than one satellite;
    (e) transmitting the corrective sequence of commands to the satellite from which the event was received, thereby configuring the satellite's operational parameters into a desired state; or alternatively, if the control site is unable to interrupt activities being performed by the control site, then
  directing the monitor site to perform steps (a), (b), (d) and (e) in place of the control site performing these tasks wherein steps (a) to (e) are performed, but if the monitor site cannot interrupt activities being performed by the monitor site, then
  communicating by the monitor site to the control site a "defer" status; and
  storing by the control site the corrective sequence of commands in a queue until such time that activities of one of the control site and monitor site allow the corrective sequence of commands to be sent by one of the control site and monitor site to the satellite from which the event was received.

10. A method for satellite ground-control of a fleet of at least one satellite, as recited in claim 9, further comprising the steps of:
  identifying parameters for selected telemetry points transmitted by selected satellites in the fleet of at least one satellite;
  identifying a ground site of the geographically-distributed ground-control sites for designation as a control site for each of the selected telemetry frames;
  identifying a ground site of the geographically-distributed ground-control sites for designation as a monitor site for each of the selected telemetry frames; and
  generating a "golden" database comprising parameters and designations identified in the identifying steps, wherein the "golden" database is distributed as a corresponding database to each ground control site, wherein each of the corresponding databases is accessible for read/write by both the control site and the monitor site via an updating means.

11. A method as recited in claim 10, wherein parameters of an event identified in the "golden" database comprise:
  an unique identifier for the event,
  an enable/disable status,
  a designated control site,
  a designated monitor site,
  a telemetry identifier,
  a location in a telemetry stream containing the telemetry identifier,
  a qualifier and trigger value defining an undesired state corresponding to the telemetry identifier, an event validation algorithm to allow sophisticated validation schemes, noise eliminating measures, a priority level, identification of time windows, if the telemetry identifier is not enabled at all times, and re-transmit measures to accommodate queued corrective command sequences.

12. A method as recited in claim 9, wherein a parameter in the "golden" database indicates that the corrective sequence is not sent automatically in response to the received event and triggers intervention by an operator prior to transmitting a corrective sequence of commands to the satellite from which the event was received.

13. A method as recites in claim 9, wherein a parameter in the "golden" database indicates that the corrective sequence is sent automatically after a time delay in response to the received event, thereby allowing user intervention, if desired.

14. A method as recited in claim 9, wherein with respect to a selected telemetry event corresponding to a selected satellite, a ground site in the network of geographically-distributed ground-control sites may be designated as a control site or monitor site for the selected telemetry event satellite, thereby disabling control and monitoring of a previously designated site for the selected telemetry event satellite.

* * * * *